United States Patent
Hsieh et al.

(10) Patent No.: US 12,050,373 B2
(45) Date of Patent: Jul. 30, 2024

(54) PRIVACY DISPLAYS

(71) Applicant: Hewlett-Packard Development Company, L.P., Spring, TX (US)

(72) Inventors: Hsing-Hung Hsieh, Taipei (TW); Kun-Chin Chien, Taipei (TW); FEng Cheng Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 241 days.

(21) Appl. No.: 17/419,261

(22) PCT Filed: Jul. 31, 2019

(86) PCT No.: PCT/US2019/044418
§ 371 (c)(1),
(2) Date: Jun. 28, 2021

(87) PCT Pub. No.: WO2021/021171
PCT Pub. Date: Feb. 4, 2021

(65) Prior Publication Data
US 2022/0171221 A1 Jun. 2, 2022

(51) Int. Cl.
*G02F 1/13* (2006.01)
*G02B 27/30* (2006.01)
*G02F 1/1335* (2006.01)
*G02F 1/13357* (2006.01)

(52) U.S. Cl.
CPC ........... *G02F 1/1323* (2013.01); *G02B 27/30* (2013.01); *G02F 1/133504* (2013.01); *G02F 1/133615* (2013.01)

(58) Field of Classification Search
CPC ............ G02F 1/1323; G02F 1/133504; G02F 1/133615; G02B 27/30; G02B 2207/123; G02B 5/0257; G02B 5/0242; G06F 21/84
USPC ........................................................ 359/237
See application file for complete search history.

(56) References Cited

U.S. PATENT DOCUMENTS

| | | | |
|---|---|---|---|
| 5,843,332 A | 12/1998 | Takeuchi et al. | |
| 5,877,829 A * | 3/1999 | Okamoto | G02F 1/1334 349/110 |
| 6,211,930 B1 * | 4/2001 | Sautter | G07F 19/205 349/64 |
| 7,349,043 B2 * | 3/2008 | Sumiyoshi | G02F 1/1323 349/112 |
| 7,762,676 B2 | 7/2010 | Daly | |

(Continued)

OTHER PUBLICATIONS

Switchable Privacy Display Technology, Young Lighting, 3 pages, retrieved Apr. 22, 2019, available at: www.younglighting.com/core_con.php?lang=en&idept=3&isdept=1.

*Primary Examiner* — William R Alexander
(74) *Attorney, Agent, or Firm* — Quarles & Brady LLP

(57) ABSTRACT

According to an example, a display having a display surface may comprise a backlight, a collimator, and a scattering layer. The backlight may emit light towards the display surface, the light being narrowed by the collimator. The collimator may be located between the display surface and the backlight and the scattering layer may be between the display surface and the collimator. The scattering layer may be selectively operable between a diffuse state in which light traveling through the scattering layer is scattered and a non-diffuse state in which the direction of travel of the light traveling through the scattering layer is substantially unaffected.

20 Claims, 8 Drawing Sheets

(56) References Cited

U.S. PATENT DOCUMENTS

| | | | |
|---|---|---|---|
| 8,446,548 B2* | 5/2013 | Uehara | G02B 6/0068 |
| | | | 349/86 |
| 8,502,816 B2 | 8/2013 | Butler et al. | |
| 9,047,806 B2 | 6/2015 | Lim et al. | |
| 9,244,546 B2 | 1/2016 | Mimura et al. | |
| 9,361,837 B2 | 6/2016 | Chen et al. | |
| 9,881,531 B2 | 1/2018 | Klippstein et al. | |
| 9,928,372 B2 | 3/2018 | Chang | |
| 2005/0259193 A1* | 11/2005 | Sumiyoshi | G02F 1/1323 |
| | | | 349/62 |
| 2007/0030240 A1* | 2/2007 | Sumiyoshi | G02F 1/133605 |
| | | | 345/102 |
| 2007/0268427 A1* | 11/2007 | Uehara | G02B 6/0038 |
| | | | 349/86 |
| 2009/0135336 A1 | 5/2009 | Sumiyoshi et al. | |
| 2016/0098709 A1 | 4/2016 | Johnson et al. | |
| 2018/0025702 A1 | 1/2018 | Aurongzeb et al. | |

\* cited by examiner

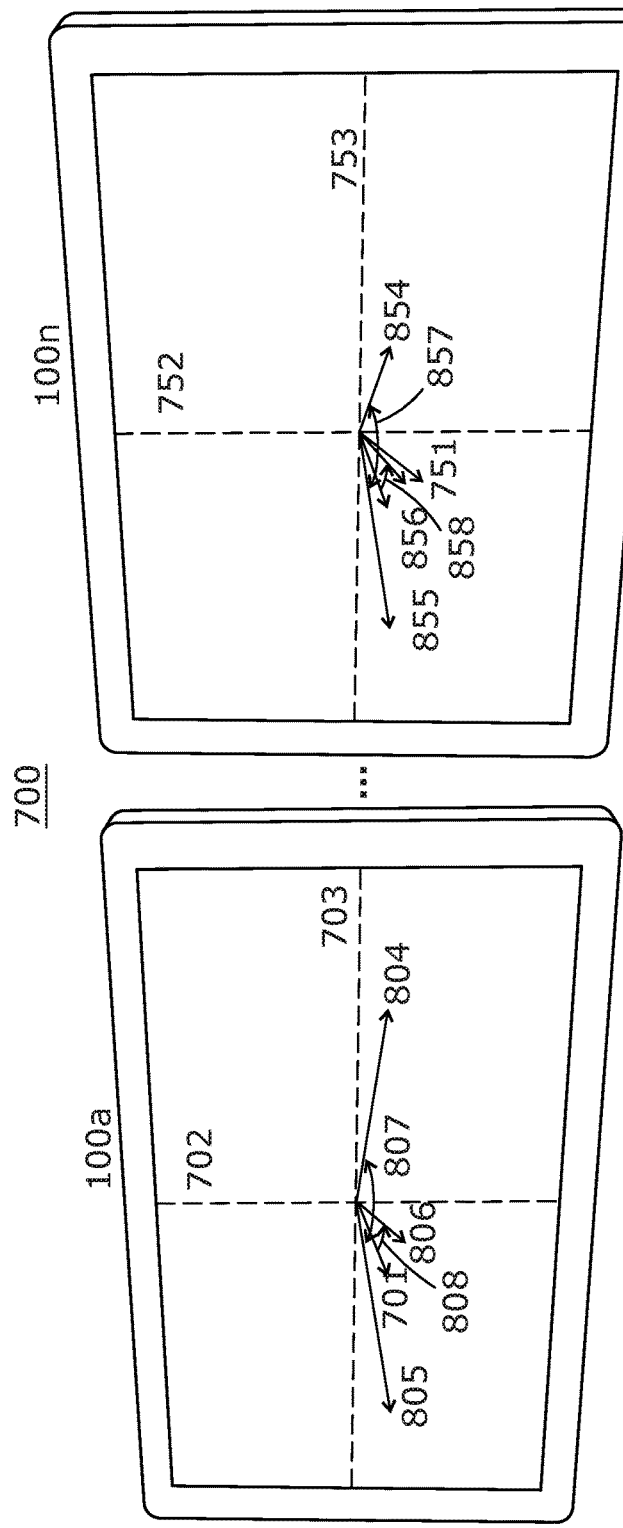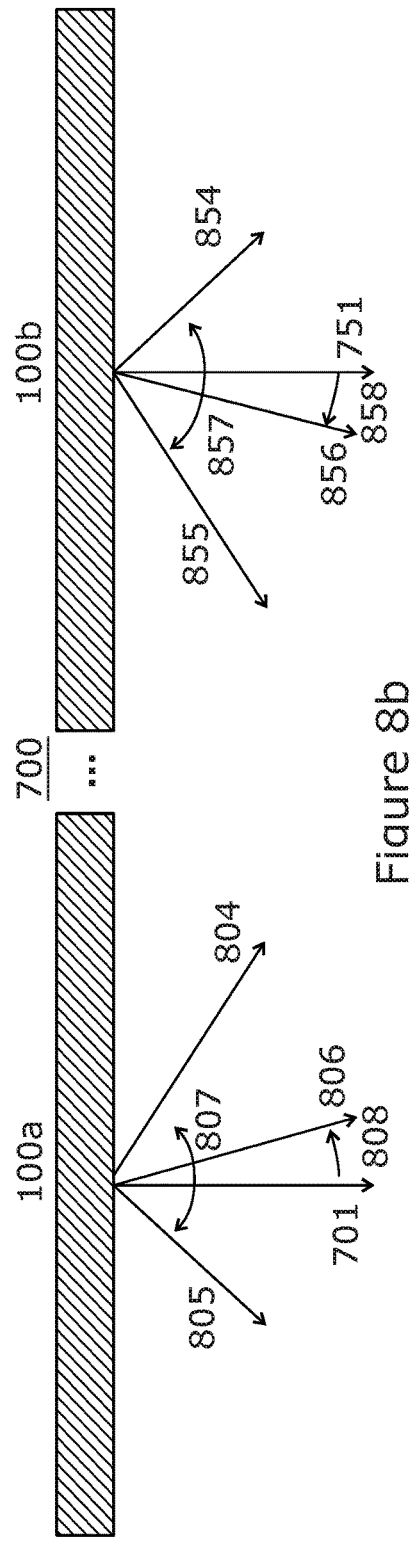

PRIVACY DISPLAYS

BACKGROUND

Displays used in electronic equipment may be used in environments in which information represented on the display may be unintentionally or undesirably seen by others. To prevent or mitigate this, display devices have been developed in which the viewing angle is reduced to allow only the proper user of the device to view the information displayed on the device.

BRIEF DESCRIPTION OF DRAWINGS

Features of the present disclosure are illustrated by way of example and are not limited in the following figure(s), in which like numerals indicate like elements, in which:

FIG. 2b shows a cross-section of the collimator of FIG. 2a;

FIG. 3b shows a top view of the privacy display of FIG. 3a;

FIG. 4b shows a top view of the privacy display of FIG. 4a;

FIG. 5b shows a side view of the privacy display of FIG. 5a;

FIG. 6b shows a side view of the privacy display of FIG. 6a;

FIG. 7b shows a top view of the privacy display assembly of FIG. 7a;

FIG. 8a shows a front view of a privacy display assembly of FIG. 7a in a non-diffuse state, according to an example of the present disclosure;

FIG. 8b shows a top view of the privacy display assembly of FIG. 8a;

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to.

According to an example, a privacy display may comprise a backlight, a collimator, and a scattering layer. In use of the display, the backlight may emit light towards a display surface, the light passing through the collimator and the scattering layer. The collimator serves to narrow the direction of travel of the light from the backlight. The scattering layer between the display surface and the collimator may be selectively operable in either a diffuse state or a non-diffuse state. In the diffuse state, the light traveling through the scattering layer is scattered in many directions. In the non-diffuse state, the direction of travel of the light traveling through the scattering layer is substantially unaffected.

Throughout this description, the scattering layer will be referred to as being in a diffuse state when light passing through the scattering layer is scattered in many directions. The scattering layer will be referred to as being in a non-diffuse state when the trajectory of the light passing through the scattering layer is substantially unaffected.

In this description, the term viewing angle will be used to refer to an angular range defined by a multitude of possible viewing directions within which a display can be viewed with acceptable visual performance. The viewing angle is measured from one extreme to the opposite extreme, giving a maximum of 180 degrees for flat, one-sided displays. In case of having curved displays the maximum angle may be different.

Figures 1A, 1B:
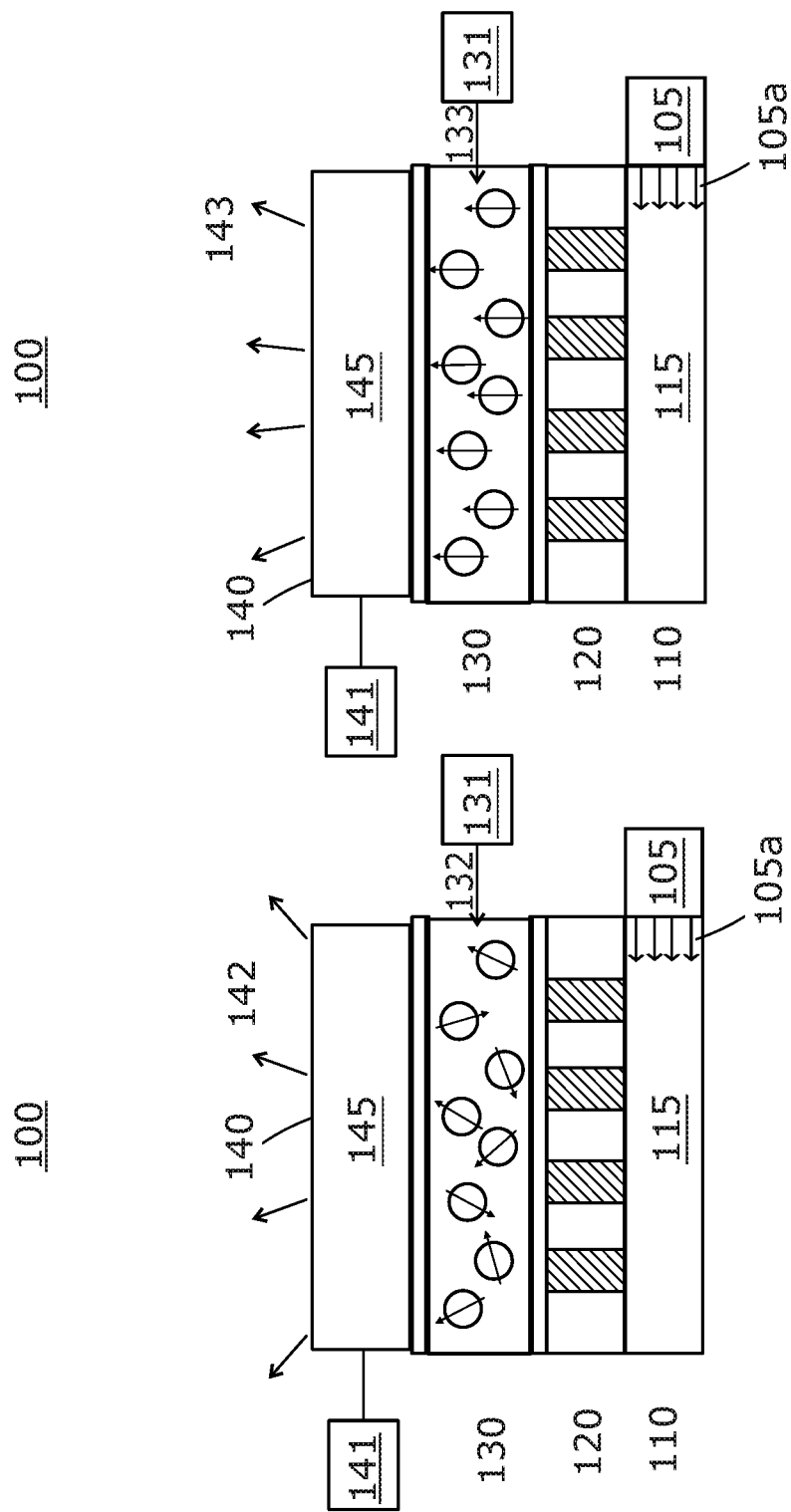
FIG. 1a shows a privacy display in a diffuse state, according to an example of the present disclosure.
FIG. 1b shows the privacy display of FIG. 1a in a non-diffuse state.

Referring now to FIGS. 1a and 1b, there is shown a schematic view of one example of a privacy display 100 comprising a backlight 110, a collimator 120, a scattering layer 130 and a display surface 140. An image may be represented on the display surface 140 according to a signal applied at an image input 141. A display element 145 may be positioned between the display surface 140 and the scattering layer 130. The backlight 110 may emit light towards the display surface 140. The backlight may include a light source 105 and a light guide plate 115. Light emitted by backlight 110 passes through collimator 120 and scattering layer 130. The light is narrowed by collimator 120. Scattering layer 130 may be selectively operable in two states: a diffuse state and a non-diffuse state. The state of the scattering layer state may be switched by a signal applied at an input 131 to scattering layer 130. For instance, a first input signal 132 may select a diffuse state as shown in FIG. 1a. In the diffuse state, light is scattered as it passes through scattering layer 130 giving rise to a wide viewing angle 142 for the display 100.

Referring now to FIG. 1b, a second input signal 133 may select a non-diffuse state of the scattering layer 130. In the non-diffuse state of the scattering layer 130, the light orientation may be substantially unmodified, giving rise to a narrower viewing angle 143 for the display 100.

According to some examples, backlight 110 may comprise a light source 105 and a light guide plate 115 extending parallel to display surface 140. The light source 105 may be located at the edge of the light guide plate 115 and generate light beams 105a which are spread by the light guide plate 115. Light 105a may be oriented to an output direction orthogonal to the light guide plate 115 top surface. In other examples, the light source 105 may be behind the light guide plate. In some examples, the light source 105 may be composed by lighting elements, such as light-emitting diodes (LEDs), electroluminescent panels (ELP) or cold-cathode fluorescent lamps (CCFLs). The light guide plate 115 may comprise reflective material to orient the light towards the display surface 140.

According to some examples, collimator 120 may be a grating having spaced parallel elements extending parallel to the display surface in a vertical direction in normal use of the display.

Figure 2A:
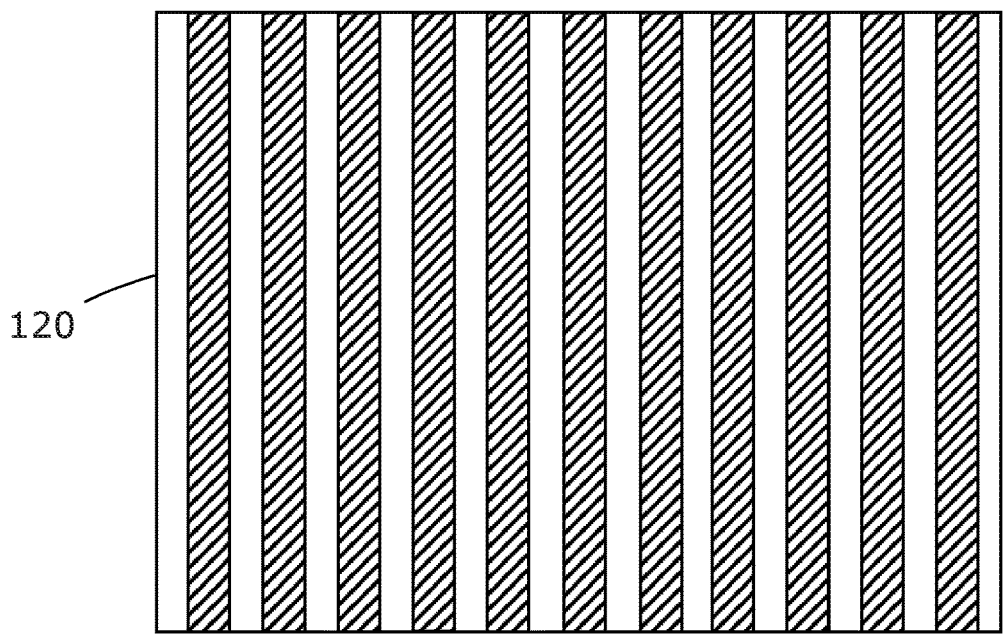
FIG. 2a shows a front view of a collimator in a first direction, according to an example of the present disclosure.

Referring now to FIG. 2a, a front view is shown of the collimator 120 with parallel elements extending in a vertical direction in normal use of the display direction. Collimator 120 may narrow the light emitted by the backlight 110 in an orthogonal direction to the vertical direction. As a result, when the light emitted by the backlight passes through the collimator, the light is narrowed in this orthogonal direction.

Figure 2B:
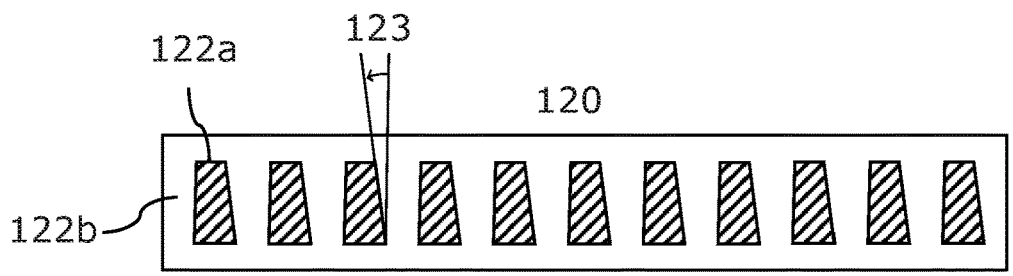

Referring now to FIG. 2b, a cross-sectional view of the collimator 120 is shown. Light emitted by the backlight 110 is narrowed by the collimator 120 in a direction perpendicular to the spaced elements of the collimator. In the example of FIG. 2b, each element 122a has the same cross-section. However, in other examples, the geometries of the elements 122a within the collimator may be different. Collimator 120 may have oblique inner surfaces, that is slopes in the elements 122a. In the example of FIG. 2b, an element 122a has an inclination 123 in one of the inner faces. In other examples, the elements 122a may have a different geometry. Apertures 122b allow the light to pass through the collimator. The apertures 122b may be equal or may follow a distribution. In the example of FIG. 2b the apertures 122b are equal.

Figure 2C:
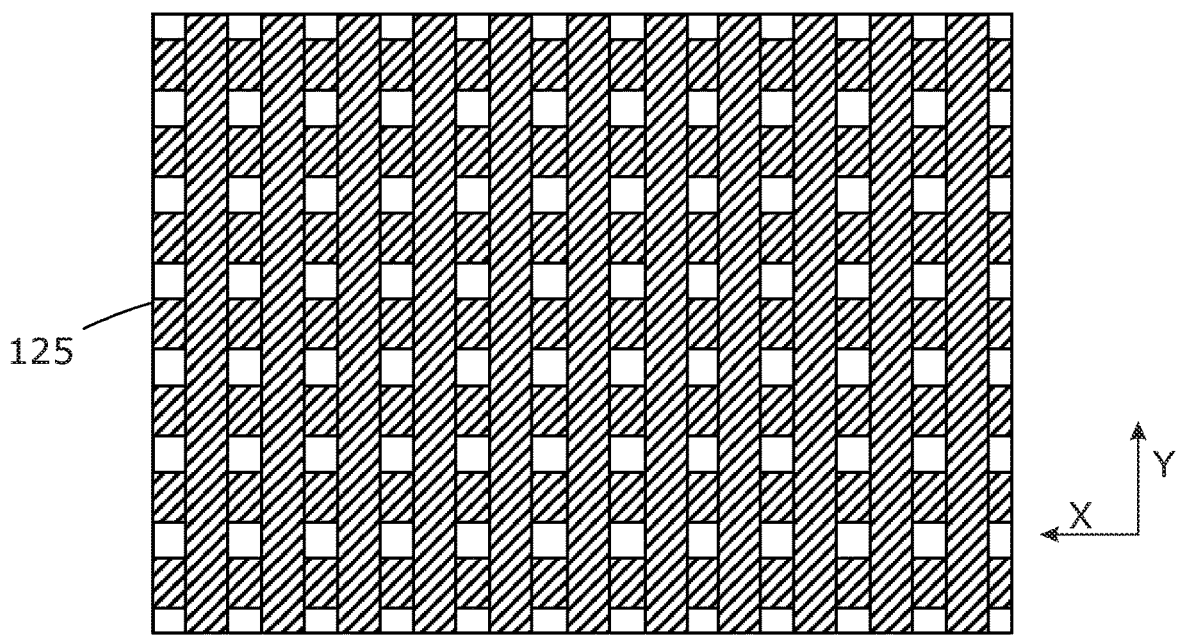
FIG. 2c shows a front view of a collimator in a second direction, according to an example of the present disclosure.

Referring now to FIG. 2c, a front view of a collimator 125 is shown. The spaced parallel elements extending parallel to the display surface are oriented in a first orientation X and a second orientation Y so that a network of crossed elements is defined. Collimator 125 narrows the light emitted by the backlight 110 in two perpendicular directions relative to the orientations. The spaced parallel elements extending parallel to the display surface of the first orientation X may have different geometry and spacing from the spaced parallel elements extending parallel to the display surface of the second orientation Y.

In some examples, scattering layer 130 may be a Polymer Dispersed Liquid Crystal (PDLC) layer. A PDLC layer may consist of micron-sized droplets of liquid crystal dispersed in an optically isotropic polymer matrix. A PDLC layer is capable of changing its physical properties in response to an electrical potential, e.g. an electrical field. By applying different electrical potentials different degrees of transparency may be obtained. When a first electric field is applied to the PDLC layer, the liquid crystal molecules within the micro-droplets align with the electric field such that the higher relative permittivity of the liquid crystal is aligned parallel to the electric field. The electrical field causes the droplets to have a first refractive index. The liquid crystal materials which have positive dielectric anisotropy may align with their long-molecular axis parallel to the field direction when a first electric field is applied to the PDLC layer. In an example, the electric field is applied as a first electrical potential, e.g. a first voltage value. When a second electric field is applied to the PDLC layer a different alignment of the molecules in the micro-droplets may provide a second refractive index. The second electric field may be obtained by applying a second electrical potential, e.g. a second voltage value. The diffuse state of the PDLC layer may be obtained when applying a first electric field and the non-diffuse state may be obtained when applying a second electric field. In other examples, the PDLC layer may be a Polymer Stabilized Cholesteric Texture (PSCT) layer or a Polymer Free Cholesteric Textured (PFCT) layer.

In some examples, the display element 145 of privacy display 100 may be a Liquid-Crystal Display element (LCD). The LCD element may be positioned between the backlight 110 and the scattering layer 130. In other examples, the LCD element may be positioned between display surface 140 and backlight 110.

According to an example, a display having a display surface 140 may comprise an actuator to switch between a sharing mode and a privacy mode. The sharing mode may refer to a diffuse state of the scattering layer 130 and the privacy mode to a non-diffuse state of a scattering layer 130. The display may comprise a backlight, a collimator, and a scattering layer. A backlight 110 may emit light towards the display surface and the collimator may narrow a direction of travel of the light from the backlight. The collimator may be located between the display surface and the backlight. The scattering layer 130 may be located between the collimator and the backlight and may change a physical property upon reception of an input from the actuator. In some examples, the physical property may be transparency. In other examples may be the refractive index of the layer. A first input may trigger a sharing mode for the display and a second input may trigger a privacy mode for the display. During the sharing mode of the display the light traveling through the scattering layer is scattered and during the privacy mode of the display the direction of travel of the light traveling through the scattering layer is substantially unaffected. In other examples, the actuator may be the input 131 represented in FIGS. 1a-1b.

In other examples, the display provides a first viewing angle in the sharing mode of the display and a second viewing angle in the privacy mode of the display, wherein the first viewing angle may be larger than the second viewing angle.

Figure 3A:
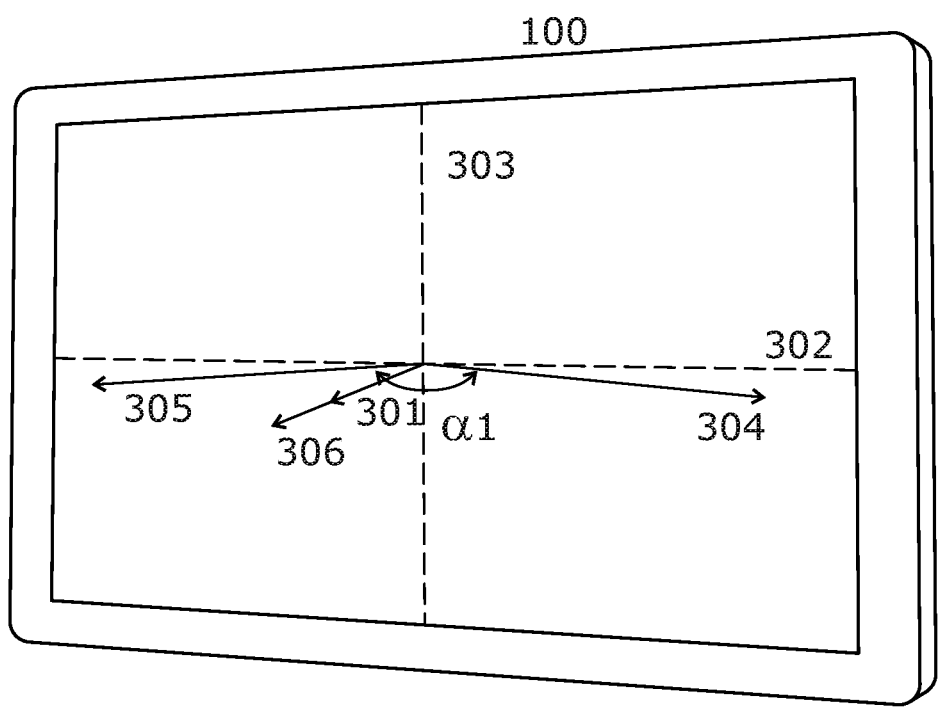
FIG. 3a shows a front view of a privacy display in a diffuse state, according to an example of the present disclosure.

Referring now to FIG. 3a, a front view of an example privacy display 100 in the diffuse state of the scattering layer is shown. The diffuse state may be triggered by an input so that a physical property of the scattering layer is modified. The physical property may be a refractive index. A display normal vector 301 may be defined as a vector orthogonal to the display surface of the privacy display 100. A first direction 302 and a second direction 303 may correspond to a horizontal direction in normal use of the privacy display and a vertical direction in normal use of the privacy display respectively. However, other directions may be possible, e.g. a first direction perpendicular to a second direction wherein the first direction may have a different orientation than horizontal. The privacy display 100 collimator may narrow a direction of travel of the light in a direction, for instance, the first direction 302.

Figure 3B:
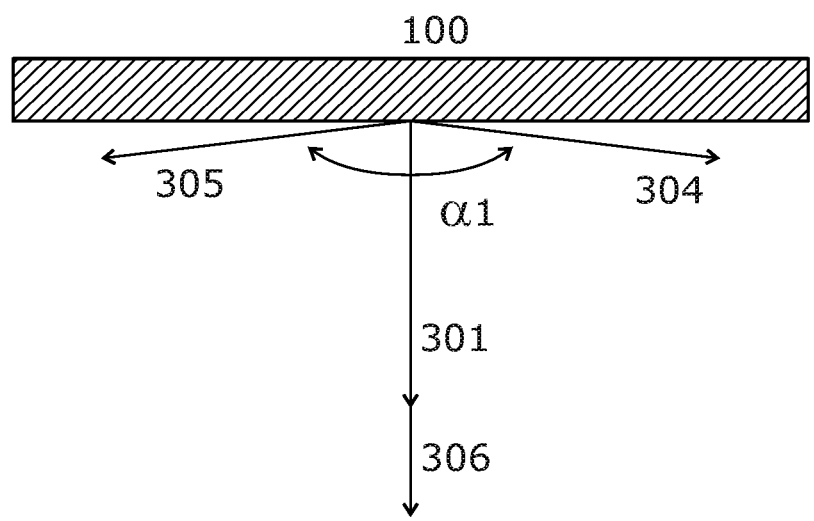

Referring now to FIG. 3b, a top view of the privacy display 100 of FIG. 3a is shown. A viewing angle $\alpha_1$ in the diffuse state of the scattering layer is defined. The viewing angle $\alpha_1$ may be measured between the right vector 304 and the left vector 305. The bisector of the viewing angle $\alpha_1$ may be referred to as first bisector 306. The first bisector 306 may be substantially parallel to the display normal vector 301.

Figure 4A:
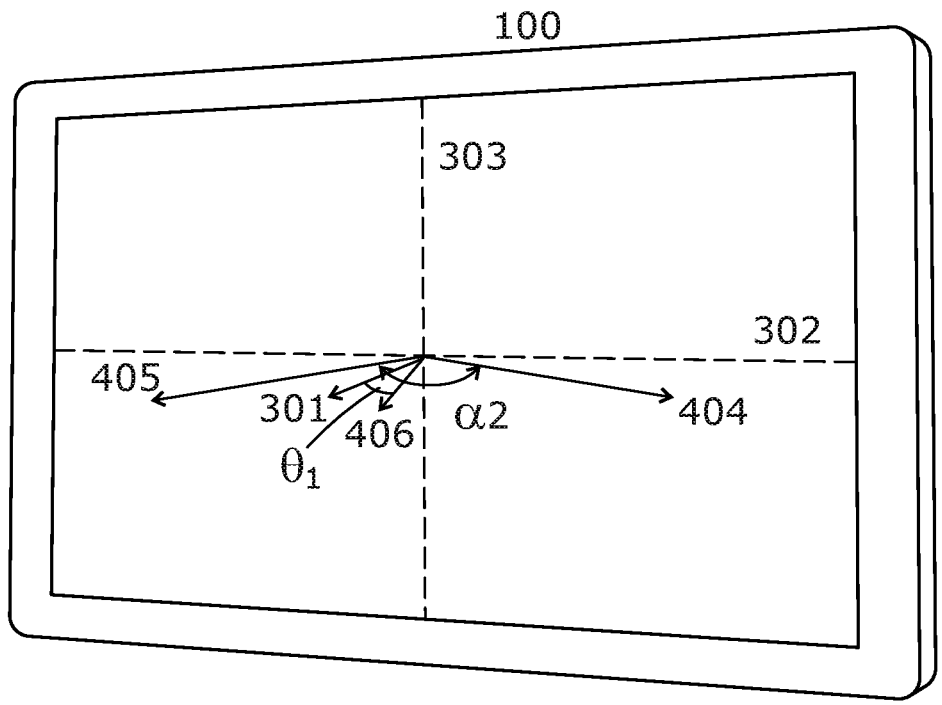
FIG. 4a shows a front view of the privacy display of FIG. 3a in a non-diffuse state, according to an example of the present disclosure.

Referring now to FIG. 4a, a front view of privacy display 100 of FIG. 3a is shown in the non-diffuse state of the scattering layer. The non-diffuse state may be triggered by a second input so that a physical property of the scattering layer is modified. The physical property may be the transparency of the layer. When the scattering layer is in the non-diffuse state, the direction of travel of the light traveling through the scattering layer is substantially unaffected. A right vector 404 and a left vector 405 may define a second viewing angle $\alpha_2$.

Figure 4B:
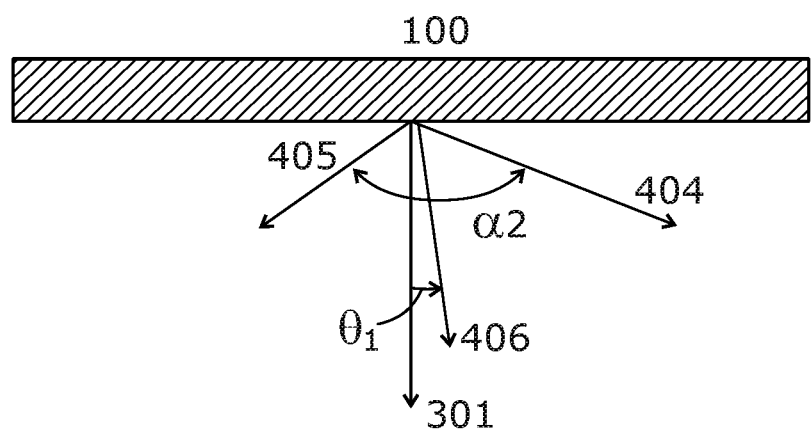

Referring now to FIG. 4b, a top view of the privacy display 100 of FIG. 4a is shown. The viewing angle $\alpha_2$ may be measured from the right vector 404 and the left vector 405. The bisector of the second viewing angle $\alpha_2$ may be referred to as second bisector 406. A display normal vector 301 may form an angle $\theta_1$ with the second bisector 406.

However, in other examples, the collimator may narrow different directions of travel of the light, for instance, a vertical direction in normal use of the privacy display. Other examples include other collimator configurations which may narrow the direction of the light in a combination of directions, e.g. a first direction which may correspond to a horizontal direction in the normal use of the display and a second direction perpendicular to the first direction.

Figure 5A:
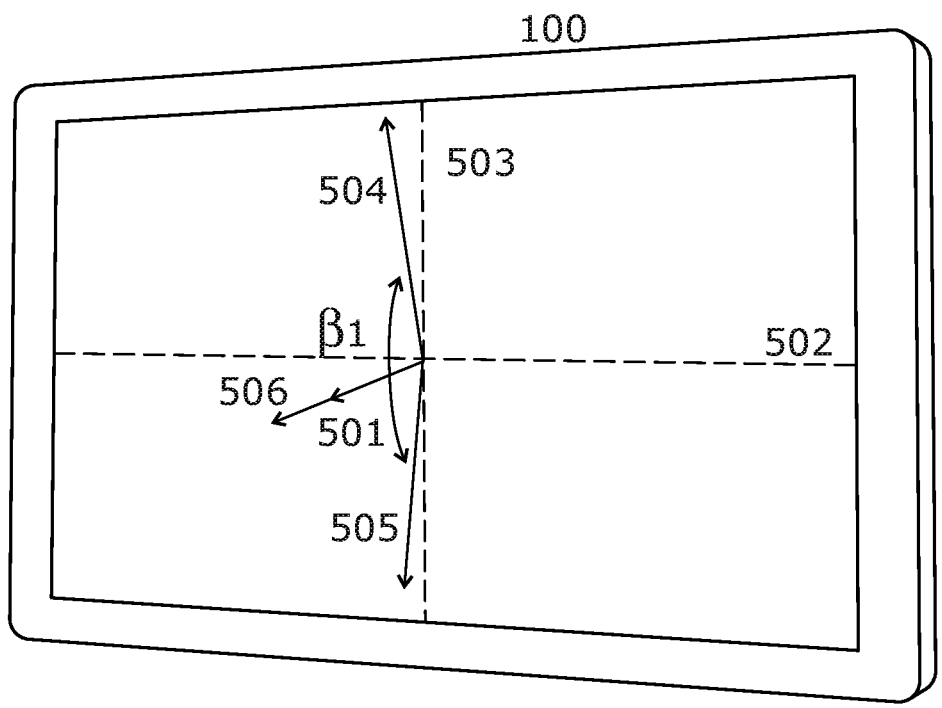
FIG. 5a shows a front view of a privacy display in a diffuse state, according to an example of the present disclosure.

Referring now to FIG. 5a, a front view of a privacy display 100 in the diffuse state of the scattering layer is shown. A display normal vector 501 may be defined as a vector orthogonal to the privacy display 100. A first direction 502 and a second direction 503 may correspond to a horizontal direction in a normal use of the privacy display and a vertical direction in normal use of the privacy display respectively. However, other alternatives may be possible, e.g. a first direction perpendicular to a second direction wherein the first direction may have a different orientation than the horizontal. The collimator of the privacy display 100 may narrow a direction of travel of the light in a direction, for instance, the second direction 503.

Figure 5B:
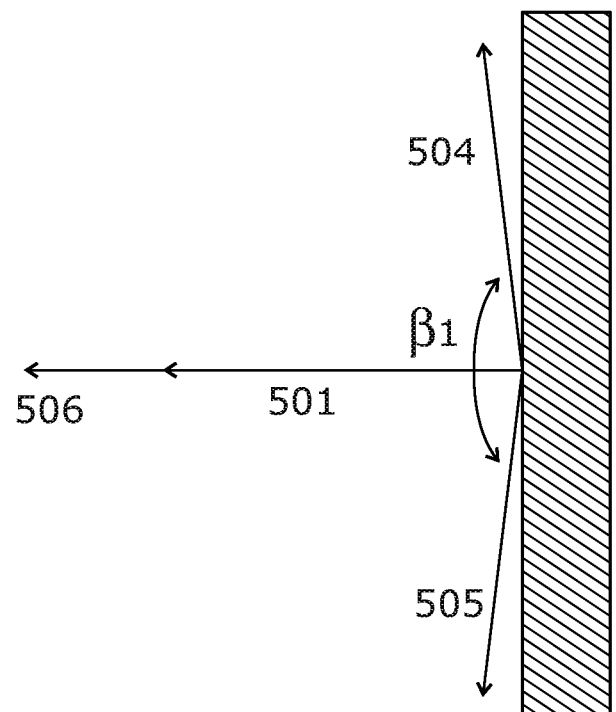

Referring now to FIG. 5b, a top view of the privacy display 100 of FIG. 5a is shown. The privacy display 100 defines a viewing angle $\beta_1$ in the diffuse state of the scattering layer. The viewing angle 31 may be measured from the upper vector 504 and the lower vector 505. The bisector of the viewing angle 31 may be referred to as first bisector 506. The first bisector 506 may be substantially parallel to the display normal vector 501.

Figure 6A:
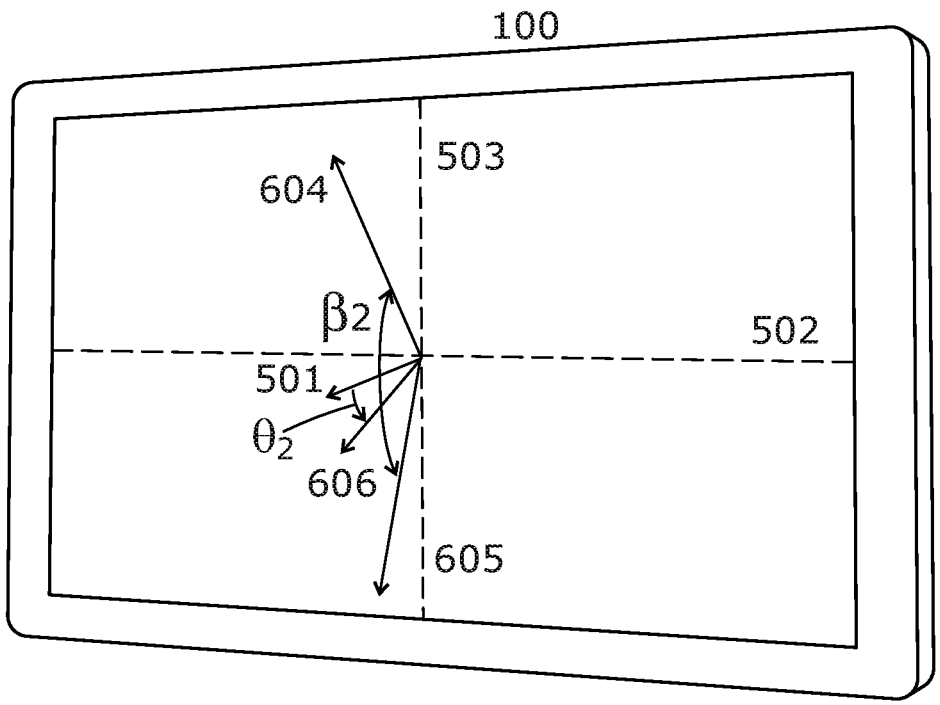
FIG. 6a shows a front view of the privacy display of FIG. 5a in a non-diffuse state, according to an example of the present disclosure.

Referring now to FIG. 6a, a front view of privacy display 100 of FIG. 5a is shown in the non-diffuse state of the scattering layer. During the non-diffuse state, the direction of travel of the light traveling through the scattering layer may be substantially unaffected. An upper vector 604 and a lower vector 605 may define a second viewing angle β2.

Figure 6B:
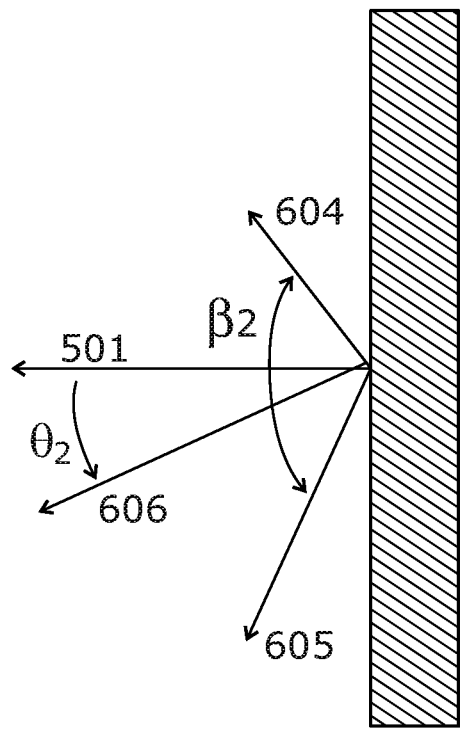

Referring now to FIG. 6b, a side view of the privacy display 100 of FIG. 6a is shown. The bisector of the second viewing angle $\beta_2$ may be referred to as second bisector 506. A display normal vector 501 may form an angle $\theta_2$ with the second bisector 606.

According to some examples, a display assembly may comprise at least two displays. The displays may have the same state of the scattering layers and may be positioned adjacent with each other. The collimator for each of the displays may provide different angles relative to each of the display(s) normal vector(s). In an example, a display assembly comprising two or more displays has at least two angles which are different, wherein the angles refer to a difference between the display normal vector and the bisector of the second viewing angle.

In other examples, a display assembly having two identical displays has a first orientation for the first display and a second orientation for the second display, wherein the first orientation is 180 degrees away from the second orientation.

Figure 7A:
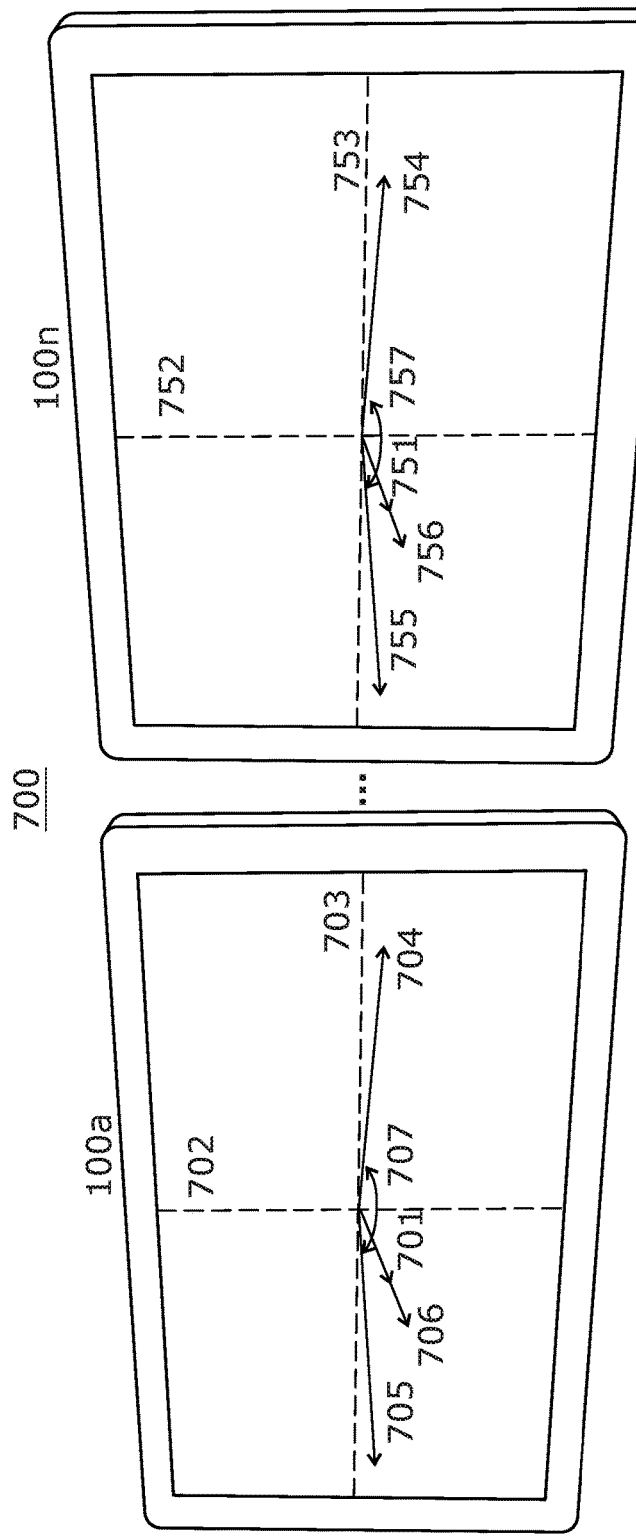
FIG. 7a shows a front view of a privacy display assembly in a diffuse state, according to an example of the present disclosure.

Referring now to FIG. 7a, a front view of a display assembly 700 in a diffuse state of the scattering layer is shown. The display assembly 700 may comprise two or more displays. Each of the displays may correspond to a privacy display described in the FIGS. 3a to 6b. The displays may be identified from a first display 100a to an n-display 100n, where "n" indicates the number of displays comprised in the display assembly 700. The diffuse state may be triggered by a first input provided to each of the scattering layers. The example of FIG. 7a corresponds to a diffuse state of the scattering layer so that the light traveling through each of the scattering layers is scattered in many directions. A first direction may be defined for each of the displays. The first direction 703 of the first display 100a may be parallel to the first direction 753 of the n-display 100n. In the diffuse state, the first display 100a may define a viewing angle 707 and the n-display 100n a viewing angle 757. A bisector may be defined for each of the viewing angles, i.e. a bisector 706 for the first display 100a and a bisector 756 for the n-display 100n.

Figure 7B:
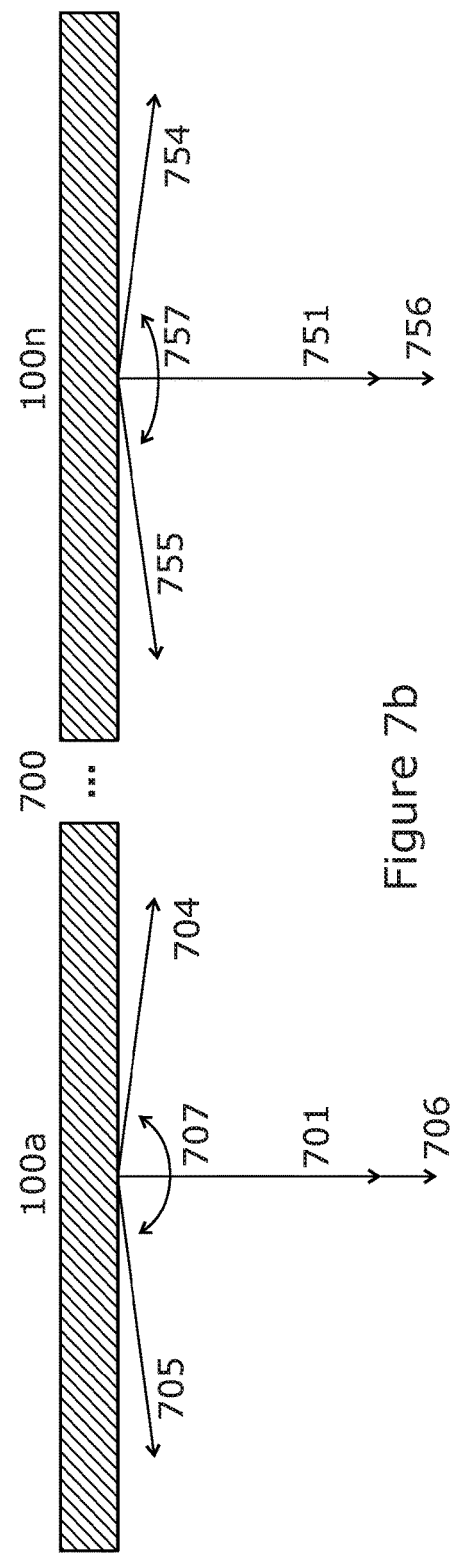

Referring now to FIG. 7b, a top view of the display assembly 700 of FIG. 7a is shown. The bisector 706 of the first display 100a and the bisector 756 of the n-display 100n may be substantially parallel to the first display normal vector 701 and the n-display normal vector 751.

Referring now to FIG. 8a, a front view of the display assembly 700 of FIG. 7a is shown in a non-diffuse state of the scattering layer. The non-diffuse state may be triggered by a second input in each of the scattering layers. In the non-diffuse state of the scattering layer, the direction of travel of the light traveling through the scattering layer is substantially unaffected. Each of the collimators may narrow the light emitted by the backlight in a direction. In the example of FIG. 8a, the collimators narrow the light in the first direction 703 in the first display 100a and in the first direction 753 in the n-display 100n. In other examples, the light emitted by each of the backlights may be narrowed in other directions. In some other examples, the display assembly 700 may use the collimators described in FIGS. 2a to 2c. Each of the displays may define a viewing angle during the non-diffuse state of the scattering layer, i.e. a viewing angle 807 for the first display 100a and a viewing angle 857 for the n-display 100n. The viewing angle 807 may be defined by a right vector 804 and a left vector 805 and the first viewing angle 857 may be defined between a right vector 854 and a left vector 854. A bisector may be defined for each of the viewing angles: a first display bisector 806 and an n-display bisector 856.

Referring now to FIG. 8b, a top view of the display assembly 700 of FIG. 8a is shown. The bisector 806 of the first display 100a and the bisector 856 of the n-display 100n may define an angle with each of the display normal vectors, i.e. an angle 808 between the first display normal vector 701 and the first display bisector 806 and an angle 858 between the n-display normal vector 751 and the n-display bisector 856. In other examples, when having a display assembly comprising two identical displays, the first display 100a may have a first orientation and the n-display 100n a second orientation, wherein the first orientation may be 180 degrees away from the second orientation.

According to an example, a display system may comprise two privacy displays within a state. Each display may be one of the previously described. The term state indicates a state for the scattering layer of each of the displays. Each display may comprise a display surface, a backlight, a series of parallel elements and a scattering layer. As explained in the previous examples, the backlight, in use, emits light towards the display surface. The series of parallel elements may extend parallel to the display surface and may narrow a direction of travel of the light from the backlight, the parallel elements being located between the display surface and the backlight. The scattering layer may have a state selected between a diffuse state and a non-diffuse state, being positioned between the display surface and the series of parallel elements. The parallel elements of the first display may be different than the parallel elements of the second display, so that different directions of the light may be narrowed. However, in other examples, the parallel elements may the same geometry while getting different spacing distributions.

In other examples of display systems, the first display and the second display provide a first viewing angle when the state of the scattering layer is the diffuse state and a second viewing angle when the state of the scattering layer is a non-diffuse state.

In other examples, a display assembly may have different angles in each of the displays. The angles formed between the bisectors of the viewing angles and the display normal vectors may be comprised in a range from −45 degrees to 45 degrees. In an example in which the display assembly has two displays having a collimator to narrow the light a horizontal direction in a normal use of the display, the first angle may be 25 degrees and the second angle may be −25 degrees. In another example wherein the collimator narrows a vertical direction in a normal use of the display, the angles may be the same in the two displays, for instance, 5 degrees.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

The invention claimed is:

1. A display having a display surface comprising:
a backlight to emit light towards the display surface,
a collimator to narrow a direction of travel of the light from the backlight, the collimator located between the display surface and the backlight, and;
a scattering layer between the display surface and the collimator, the scattering layer being selectively operable between a diffuse state in which light traveling through the scattering layer is scattered in many directions and a non-diffuse state in which the direction of travel of the light traveling through the scattering layer is substantially unaffected,
wherein the display provides a second viewing angle, wherein a bisector of the second viewing angle forms an angle with a display normal vector.

2. A display as claimed in claim 1 wherein the collimator narrows in a first direction the light emitted by the backlight.

3. A display as claimed in claim 2 wherein the display provides a first viewing angle when the scattering layer is in the diffuse state and the second viewing angle when the scattering layer is in the non-diffuse state.

4. A display as claimed in claim 2 wherein the collimator is a grating having parallel elements extending parallel to the display surface and perpendicular to the first direction.

5. A display as claimed in claim 4 wherein the parallel elements have oblique inner surfaces.

6. A display system comprising two or more displays as claimed in claim 1, wherein the angles of at least two displays are not equal.

7. A display as claimed in claim 1 wherein the collimator narrows the light emitted by the backlight in a first direction and a second direction, wherein the second direction is perpendicular to the first direction.

8. A display as claimed in claim 7 wherein the collimator is a grid extending parallel to the display surface, the grid comprising a network of elements that narrow the light in the first direction and the second direction, wherein when the scattering layer is in the non-diffuse state the viewing angles in the first direction and in the second direction are different.

9. A display as claimed in claim 8 wherein in the non-diffuse state of the scattering layer the bisector of the viewing angle in the first direction forms an angle with the display normal vector and the bisector of the viewing angle in the second direction forms a second angle with the display normal vector.

10. A display as claimed in claim 4, wherein the angle with the display normal vector is between 15 and 35 degrees.

11. A display as claimed in claim 2 wherein the first direction corresponds to a horizontal direction in a normal use of the display.

12. A system comprising:
a first display and a second display with a state, each display having:
a display surface;
a backlight to emit light towards the display surface;
a series of parallel elements extending parallel to the display surface to narrow a direction of travel of the light from the backlight, the parallel elements located between the display surface and the backlight; and,
a scattering layer between the display surface and the parallel elements, the scattering layer having the state selected between a diffuse state in which light traveling through the scattering layer is scattered and a non-diffuse state in which the direction of travel of the light traveling through the scattering layer is substantially unaffected,
wherein the parallel elements of the first display and the parallel elements of the second display are different.

13. A system as claimed in claim 12, wherein the first display and the second display provide a first viewing angle when the state of the scattering layer is the diffuse state and a second viewing angle when the state of the scattering layer is the non-diffuse state.

14. A system as claimed in claim 13 wherein the parallel elements of the first display and the parallel elements of the second display being different cause the second viewing angle of the first display and the second display to be different.

15. A system as claimed in claim 14 wherein the parallel elements of the first display and the parallel elements of the second display are arranged to cause a bisector of each of the second viewing angles to form an angle with a display normal vector, wherein the angles of the first display and the second display are equal in magnitude but opposite.

16. A system as claimed in claim 14 wherein the parallel elements of the first display and the parallel elements of the second display are arranged to cause a bisector of each of the second viewing angles to form an angle with a display normal vector, wherein the angles of the first display and the second display are in a range between −45 degrees and 45 degrees.

17. A display having a display surface comprising an actuator to switch between a sharing mode and a privacy mode, the display comprising:
a backlight to emit light towards the display surface;
a collimator to narrow a direction of travel of the light from the backlight, the collimator located between the display surface and the backlight; and, a scattering layer located between the collimator and the backlight, the scattering layer to receive an input from the actuator, the input to change a physical property of the scattering layer so that in the sharing mode the light traveling through the scattering layer is scattered and in the privacy mode the direction of travel of the light traveling through the scattering layer is substantially unaffected, wherein the display provides a second viewing angle, wherein a bisector of the second viewing angle forms an angle with a display normal vector.

18. A display as claimed in claim 17, wherein the display provides a first viewing angle in the sharing mode and the second viewing angle in the privacy mode, the first viewing angle being larger than the second viewing angle.

19. A display as claimed in claim 17 wherein the collimator narrows in a first direction the light emitted by the backlight, and wherein the collimator is a grating having parallel elements extending parallel to the display surface and perpendicular to the first direction.

20. A display as claimed in claim 19 wherein the parallel elements have oblique inner surfaces.

* * * * *

UNITED STATES PATENT AND TRADEMARK OFFICE
CERTIFICATE OF CORRECTION

PATENT NO. : 12,050,373 B2
APPLICATION NO. : 17/419261
DATED : July 30, 2024
INVENTOR(S) : Hsing-Hung Hsieh et al.

It is certified that error appears in the above-identified patent and that said Letters Patent is hereby corrected as shown below:

In the Specification

Column 5, Line 34, "31" should be --$\beta_1$--.

Column 5, Line 36, "31" should be --$\beta_1$--.

Signed and Sealed this
Fifth Day of November, 2024

Katherine Kelly Vidal
*Director of the United States Patent and Trademark Office*